United States Patent
Choi et al.

(10) Patent No.: US 7,639,754 B2
(45) Date of Patent: Dec. 29, 2009

(54) METHOD OF DETECTING A FRAME BOUNDARY OF A RECEIVED SIGNAL IN DIGITAL COMMUNICATION SYSTEM AND APPARATUS OF ENABLING THE METHOD

(75) Inventors: Joonsang Choi, Seoul (KR); Jungnam Yun, Jeju-do (KR); Jaehyeong Kim, Seoul (KR)

(73) Assignee: Posdata Co., Ltd., Seongnam-si (KR)

( * ) Notice: Subject to any disclaimer, the term of this patent is extended or adjusted under 35 U.S.C. 154(b) by 647 days.

(21) Appl. No.: 11/394,307

(22) Filed: Mar. 29, 2006

(65) Prior Publication Data

US 2007/0230592 A1    Oct. 4, 2007

(51) Int. Cl.
*H04B 7/02* (2006.01)
*H04L 27/28* (2006.01)
(52) U.S. Cl. ..................... 375/267; 375/260
(58) Field of Classification Search ............. 375/260, 375/354, 346, 349; 455/63; 370/210, 428, 370/331, 332
See application file for complete search history.

(56) References Cited

U.S. PATENT DOCUMENTS

| | | | | |
|---|---|---|---|---|
| 7,369,631 | B1 * | 5/2008 | Gifford et al. | 375/346 |
| 2002/0065047 | A1 * | 5/2002 | Moose | 455/63 |
| 2002/0122511 | A1 * | 9/2002 | Kwentus et al. | 375/343 |
| 2002/0126748 | A1 * | 9/2002 | Rafie et al. | 375/229 |
| 2004/0228272 | A1 * | 11/2004 | Hasegawa et al. | 370/210 |
| 2006/0062335 | A1 * | 3/2006 | Lee et al. | 375/343 |

FOREIGN PATENT DOCUMENTS

| | | |
|---|---|---|
| KR | 10-1998-0023283 A | 7/1998 |
| KR | 10-2000-0074824 A | 12/2000 |
| KR | 10-2003-0016121 A | 2/2003 |
| KR | 10-2005-0063590 A | 6/2005 |
| KR | 10-2005-0066562 A | 6/2005 |
| KR | 10-2005-0122794 A | 12/2005 |
| KR | 10-2006-0025769 A | 3/2006 |

* cited by examiner

*Primary Examiner*—Khai Tran
(74) *Attorney, Agent, or Firm*—Fenwick & West LLP (57) ABSTRACT

A method of detecting a frame boundary of a received signal in a digital communication system, the method including: generating a delayed signal by delaying the received signal by a predetermined period; calculating a correlation value by correlating the received signal with the delayed signal for a predetermined correlation length in a time domain; and determining a timing index corresponding to a maximum value, as a frame boundary index, from a plurality of correlation values which are obtained by repeating the calculation. According to an embodiment of the present invention, a correlation calculation in a time domain is performed without oversampling, in a limited length including a cyclic prefix. Accordingly, accuracy of frame boundary detection may be improved and complexity of hardware and software may also be reduced.

13 Claims, 9 Drawing Sheets

METHOD OF DETECTING A FRAME BOUNDARY OF A RECEIVED SIGNAL IN DIGITAL COMMUNICATION SYSTEM AND APPARATUS OF ENABLING THE METHOD

BACKGROUND OF THE INVENTION

1. Field of the Invention

The present invention relates to a method and apparatus for detecting a frame boundary from a received signal in a digital communication system.

2. Description of Related Art

A digital communication system can transmit/receive one of a discrete number of waves in an electrical or an optical form, for a discrete time interval, and includes a system transmitting data in which information represented as digital data or analog information are digitized.

As an amount of digital information increases, demands for a system which can quickly and reliably exchange digital information are also being increased. Also, in comparison to a conventional analog communication system, a digital communication system has advantages in that information can be easily retrieved and system is easily embodied. Thus, digital communication system is being widely utilized for commercial and military purposes. Accordingly, today's digital communication systems can be widely applied to various fields, such as digital broadcasting, wired/wireless Internet, digital optical communications, satellite communications, and digital mobile communications.

Most digital communication systems divide digital data to be transmitted, that is, a series of bit streams into a certain size of a frame unit. A receiver side receives a signal which is in the form of consecutive frames, and detects a frame boundary so as to extract exact data from the received signal. In this instance, the frame boundary indicates a starting position of the frame or an ending position thereof. An accurate frame boundary detection is an important factor in a multi-path wireless communication system where a channel delay is severe.

Figure 1:
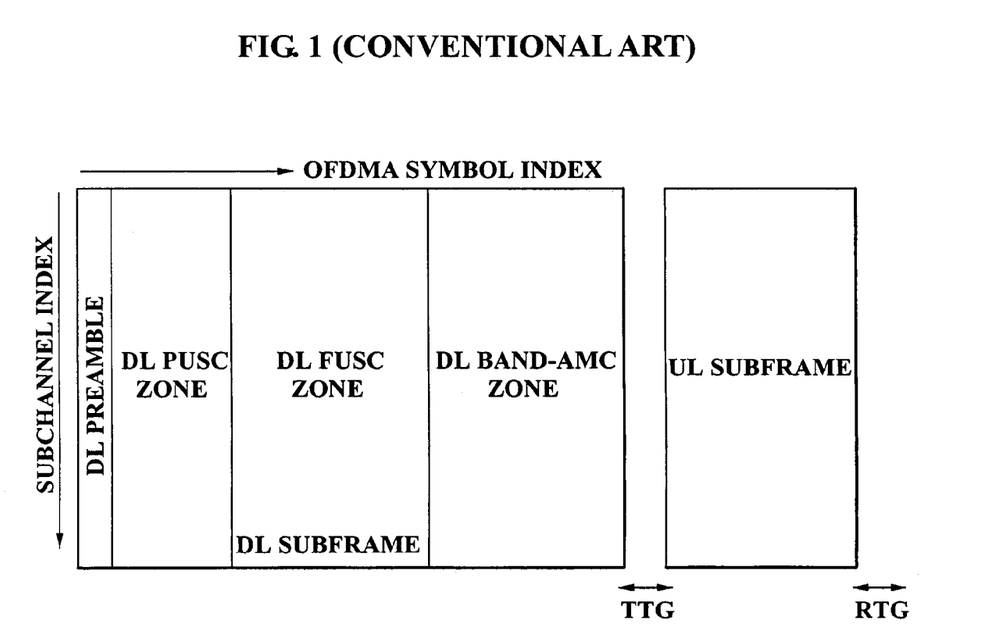
FIG. 1 is a diagram illustrating an example of an OFDMA TDD frame structure of an IEEE 802.16d/e standard.

FIG. 1 illustrates an example of an Orthogonal Frequency Division Multiple Access (OFDMA) Time Division Duplex (TDD) frame structure. The frame structure illustrated in FIG. 1 follows an Institute of Electrical and Electronics Engineers (IEEE) 802.16d/e standard. As illustrated in FIG. 1, a downlink (DL) frame is a connection between a mobile base station, i.e., a radio access station (RAS), and a portable device, i.e., a portable subscriber station (PSS). Also, the DL frame includes a DL preamble, a DL subframe and an uplink (UL) subframe. Hereinafter, a "preamble" as used in the present specification indicates a DL preamble included in a DL frame.

Referring to FIG. 1, a preamble is allocated to a first symbol of a DL frame. A starting position of the preamble may be identified on the basis of a frame boundary detected according to an aspect of the present invention. The preamble of which the starting position is identified is utilized for estimating a carrier frequency offset and searching for a cell containing a portable device. Also, the preamble may be utilized for restoring a certain data symbol contained in the frame.

OFDM/OFDMA signal is transmitted as a symbol unit. In the case of OFDM/OFDMA symbols consecutively transmitted in a time domain, signals may be overlapped or distorted because of a symbol delay occurring in a multi-path channel. To prevent the distortion of a signal caused by the symbol delay, a guard interval is inserted between consecutive symbols. In this instance, the guard interval is longer than a maximum delay spread. An OFDM/OFDMA symbol period includes a guard interval and a valid symbol period including data to be transmitted. A receiving end receives the transmitted symbol inserted between the guard intervals, as described above. The receiving end removes the guard interval and extracts data corresponding to a valid symbol period from the symbol. After this, the receiving end demodulates the data. In order to prevent a distortion of orthogonality which may occur due to a delay of a subcarrier, a part of a signal corresponding to a last portion of a valid symbol interval is copied and inserted before the symbol in the guard interval. This is referred to as a cyclic prefix (CP). As described above, since a preamble is also a kind of an OFDM/OFDMA symbol, CP is inserted in front of the preamble symbol.

Figure 2:
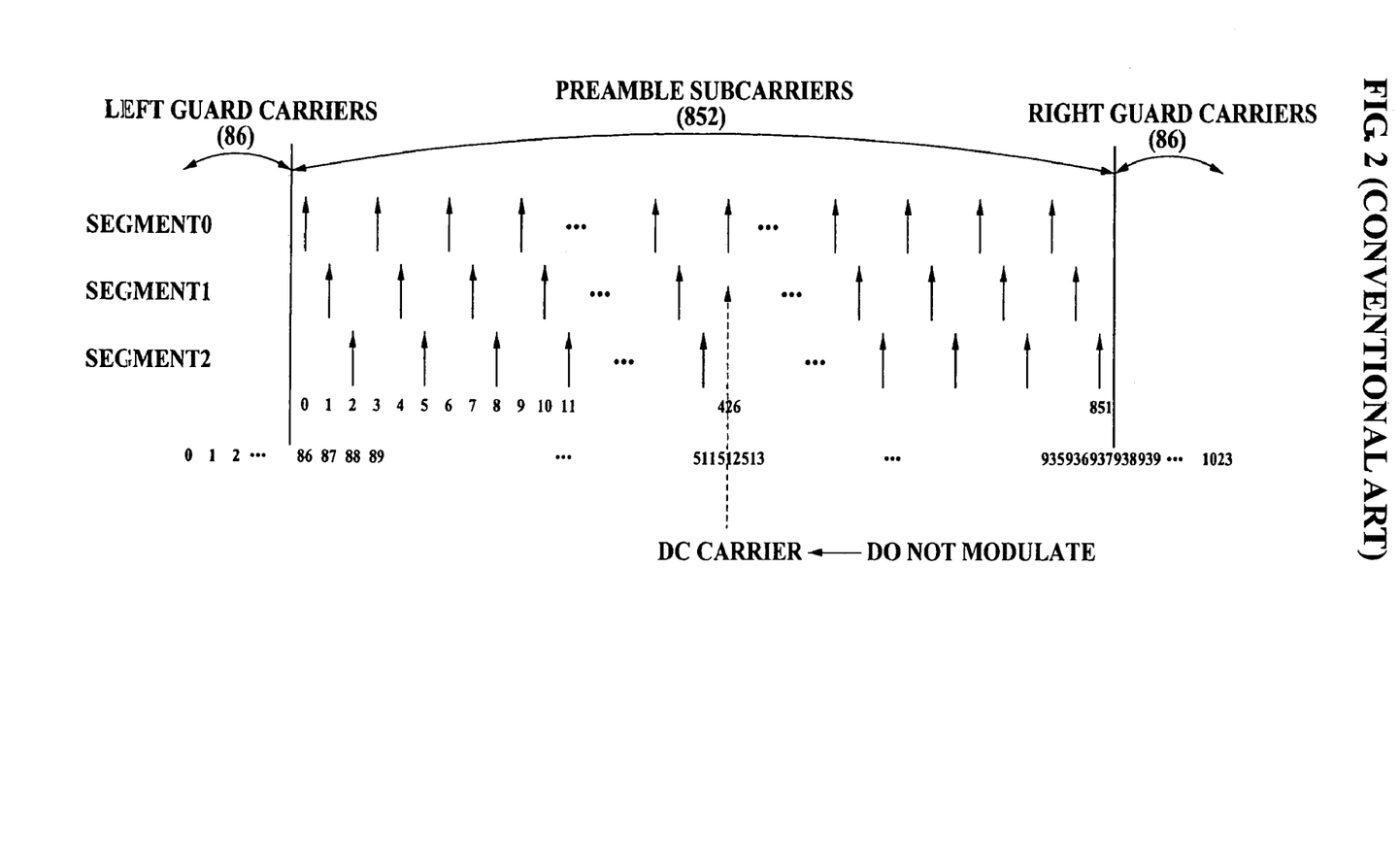
FIG. 2 is a diagram illustrating a segment-wise preamble transmission structure of a DL preamble utilized for a frame boundary detecting method and apparatus according to a technical field where the present invention belongs.

FIG. 2 is a diagram illustrating a segment-wise preamble transmission structure according to an IEEE 802.16d/e standard. As illustrated in FIG. 2, preamble subcarriers for each segment are arranged at a predetermined interval, for example, at 3 subcarrier intervals in FIG. 2. As well known to those skilled in the art, transmission data of an OFDM/OFDMA system is converted to a time domain signal via an inverse fast Fourier transform (IFFT) module of a transmitting end, and the converted signal is transmitted. The above-described operation is applied to preambles constituting a first symbol in a frame. Due to a frequency shift property of an FFT/IFFT, a preamble having a transmission structure as shown in FIG. 2 is received in the form of a signal which is periodically repeated in a time domain.

Figure 3:
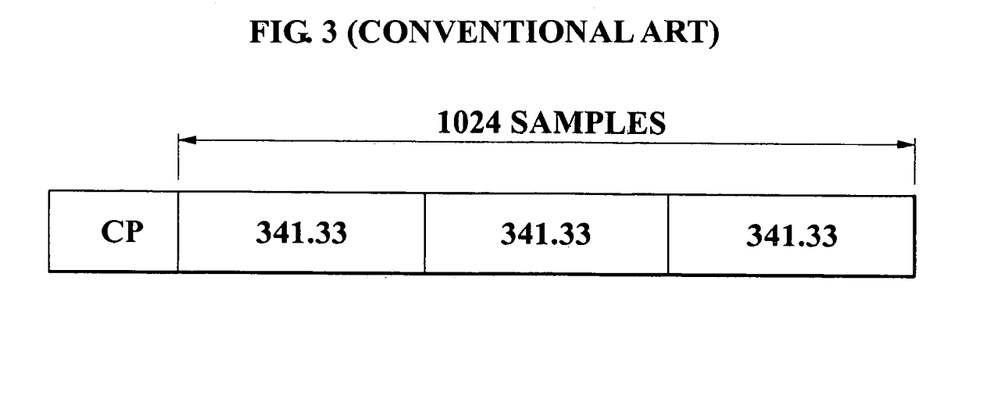
FIG. 3 is a diagram illustrating a configuration of a time domain preamble signal.

As an example, when a number of segments is three as illustrated in FIG. 2, a preamble signal in a time domain includes three repetition lengths as illustrated in FIG. three. As described above, a received preamble signal has a property of being repeated once per the repetition length. Accordingly, a frame boundary may be detected by correlating a received signal and a signal obtained by delaying the received signal by a predetermined period, for example, as much as the repetition length.

However, when an FFT size is not a multiple of three, each repetition length may be represented as a non-integer value. As an example, as illustrated in FIG. 3, each repetition length may be represented as 1024/3=341.33 samples. In this instance, FIG. 3 is a diagram illustrating a configuration of a preamble signal when an FFT size is 1024 samples and a number of segments is three according to an IEEE 802.16d/e standard. As described above, a digital signal consists of discrete samples. Accordingly, when a repetition length is represented as a non-integer value, an error may occur in frame boundary detection.

The frame boundary detecting apparatus may experience a peak broadening effect by a repetition length having a non-integer value as its length. In this instance, the peak broadening effect indicates that a correlation of a received signal and a delayed signal obtained by delaying the received signal by a predetermined time forms a wide peak group, not a sharp peak around a frame boundary index, with respect to a series of consecutively received signals. The peak broadening effect may decrease the accuracy of frame boundary detection.

To prevent the effect of an error occurring as described above, oversampling three times is required. However, oversampling three times also increases a correlation length by three times. Also, since three conjugate operations, three multiplication operations, etc., are needed, a correlation calculation complexity is increased by three. An increase in the correlation calculation complexity indicates that hardware and software resources necessary for embodying a frame boundary detecting method and apparatus are also increased.

Figure 4:
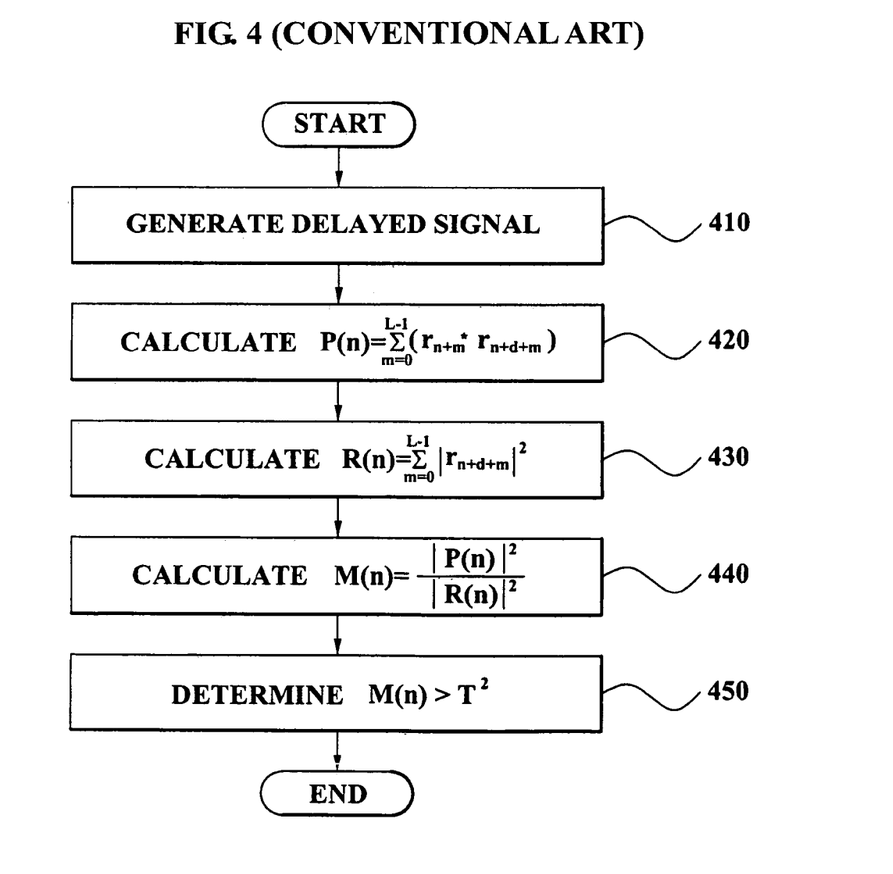
FIG. 4 is a flowchart illustrating a conventional frame boundary detecting method determining a frame boundary by comparing a normalized correlation value and a predetermined threshold.

Also, in the conventional frame boundary detecting method, a performance may be significantly deteriorated when a threshold is precisely set. FIG. 4 is a flowchart illustrating an example of a conventional frame boundary detecting method. Referring to FIG. 4, in the conventional frame boundary detecting method, in operation 410, a delayed signal is generated by delaying a received signal by a predetermined period. Also, in operations 420 and 430, an auto-correlation value P(n) and a power R(n) of a received signal are calculated by using the received signal and the delayed signal. In operation 440, a comparison value M(n) in which the P(n) is normalized to the R(n) is calculated. Finally, in operation 450, the calculated M(n) and predetermined threshold $T^2$ are compared so as to determine a frame boundary.

Namely, according to the conventional frame boundary detecting method, a frame boundary is determined by comparing a normalized auto-correlation value and a predetermined threshold. Accordingly, the threshold must be very precisely set. If the threshold is not properly set, more than a single frame boundary index are obtained. This will deteriorate reliability of frame boundary detection.

In other words, the conventional frame boundary detecting method has disadvantages such as an increase in complexity of a receiving end and deterioration of detection performance. The above-described disadvantages act as factors to limit a low power consumption and a highly efficient design of a receiving end. These properties may be not suitable for a frame boundary detecting method for a portable device of a wireless communication system which is currently in the spotlight.

Accordingly, the present invention suggests a new technology which can detect a frame boundary from a received signal with greater accuracy while using a small amount of resources.

SUMMARY OF THE INVENTION

An aspect of the present invention is to more accurately detect a frame boundary from a received signal in a digital communication system.

Another aspect of the present invention is to set a correlation length enabling an efficient detection operation by using a repetition property of a received preamble signal in a time domain.

Still another aspect of the present invention is to improve a detection performance and also decrease a complexity by constructing the correlation length to include one cyclic prefix length and repetition lengths one less than a total number of the repetition lengths in a frame.

Yet another aspect of the present invention is to improve a detection performance by employing an operation of determining a maximum value of the calculated auto-correlation value rather than comparing a calculated auto-correlation value and a predetermined threshold, for frame boundary detection.

A further aspect of the present invention is to prevent an increase in hardware and software complexity caused by oversampling, by determining a repetition length constituting a preamble signal using any one of a ceiling operation, a rounding operation, and a floor operation of a non-integer value.

Another aspect of the present invention is to embody a frame boundary detecting apparatus without oversampling for a receiving end installed with the same, thereby enabling, for example, a low power consuming, highly efficient, and inexpensive design of a portable device.

Another aspect of the present invention is to improve an overall system and a network performance by enabling a portable subscriber station (PSS) to access a remote access station (RAS) with exact timing, in an OFDM/OFDMA based wireless communication system, through accurate boundary detection.

Another aspect of the present invention is to obtain a stable detection performance by repeating frame boundary detection with respect to a plurality of consecutively received frames when a result of each frame boundary detection corresponds to a predetermined criterion.

According to an aspect of the present invention, there is provided a method of detecting a frame boundary of a received signal in a digital communication system, the method including: generating a delayed signal by delaying the received signal by a predetermined period; calculating a correlation value by correlating the received signal and the delayed signal for a predetermined correlation length in a time domain; and determining a timing index corresponding to a maximum value, as a frame boundary index, from a plurality of correlation values which are obtained by repeating the calculation.

According to another aspect of the present invention, there is provided a frame boundary detecting apparatus including: a correlation calculation unit calculating a correlation value by correlating a predetermined number of samples of a received signal and a delayed signal which is obtained by delaying the received signal by a predetermined period, in a predetermined correlation length in a time domain; and a maximum value determination unit determining a maximum value from a plurality of correlation values obtained by repeating the calculation.

Hereinafter, as an example, a method of detecting a frame boundary in a wireless communication system based on OFDM or OFDMA, which is a special type of OFDM, according to exemplary embodiments of the present invention will be described. However, the present invention is not limited thereto. Namely, digital data are transmitted per a frame unit. Also, the frame includes a particular type of identifier, for example, a DL preamble, which can identify a frame boundary. Accordingly, the present invention may be applied to all methods and apparatuses for detecting a frame boundary using such an identifier.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 5:
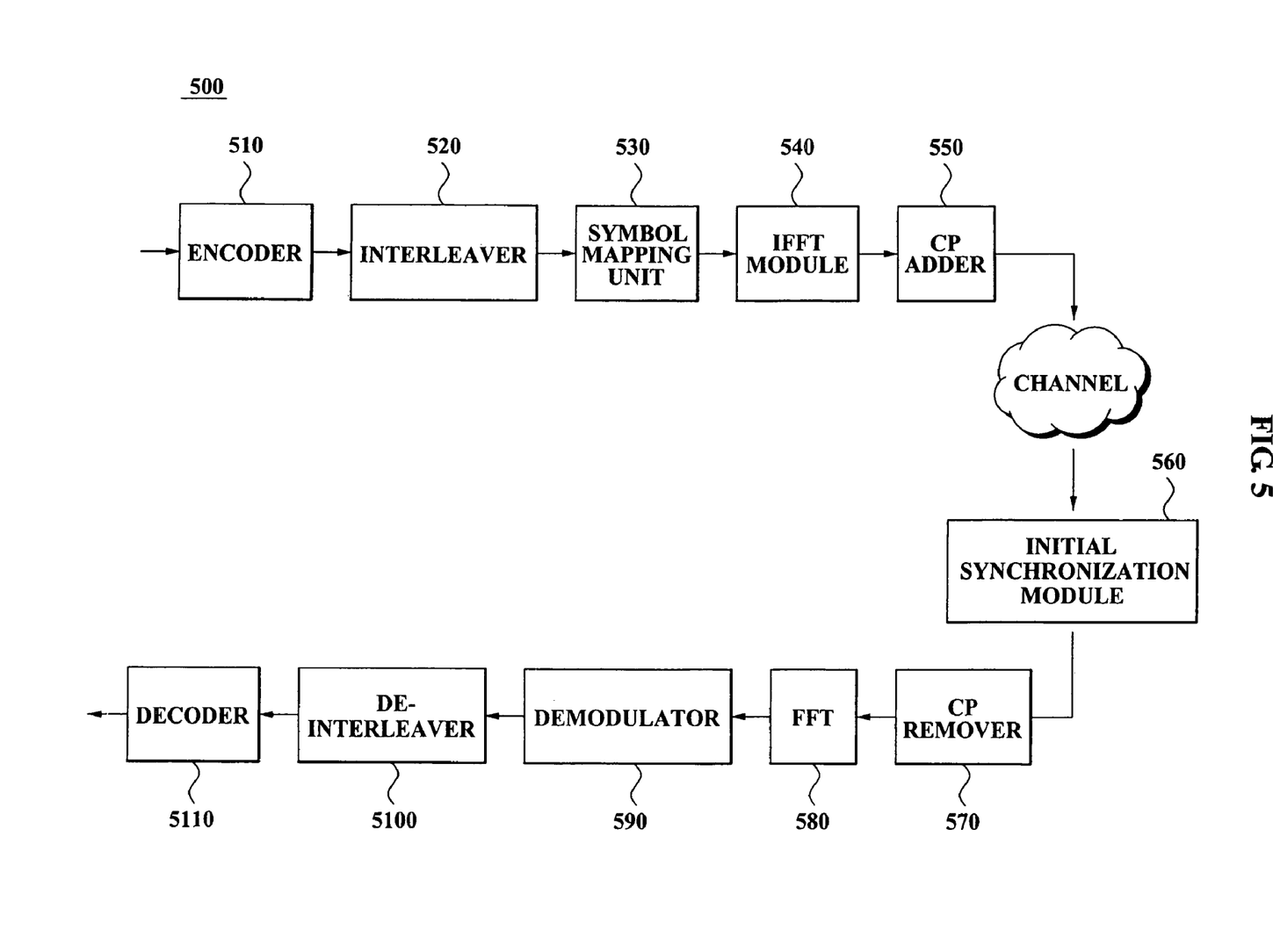
FIG. 5 is a block diagram illustrating a configuration of a digital communication system adopting a frame boundary detecting method and apparatus according to an embodiment of the present invention.

FIG. 5 is a block diagram illustrating a configuration of a digital communication system adopting a frame boundary detecting method and apparatus according to an embodiment of the present invention. Also, FIG. 6 is a block diagram illustrating an internal configuration of an initial synchronization module 560 constituting a receiving end of the digital communication system.

Figure 6:
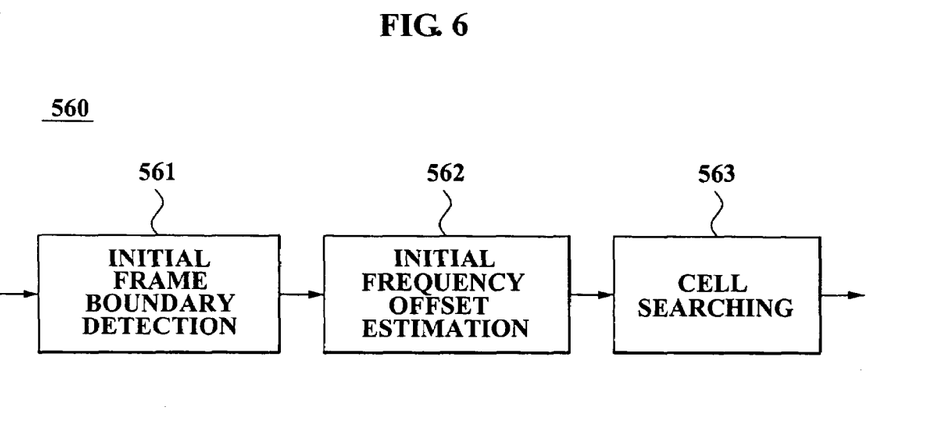
FIG. 6 is a block diagram illustrating an internal configuration of an initial synchronization module which is one element of a receiving end in a digital communication system adopting a frame boundary detecting method and apparatus according to an embodiment of the present invention.

Referring to FIGS. 5 and 6, a communication system 500 includes a transmitting end, a channel and a receiving end. The transmitting end includes an encoder 510, an interleaver 520, a symbol mapping unit 530, an inverse fast Fourier transform (IFFT) module 540 and a cyclic prefix (CP) adder 550. The encoder 510 converts source information into a digital type or compresses the source information into a type suitable for transmission by removing redundant information or superfluous information from information represented as a digital value. The encoded digital data as above has little tolerance for a burst error occurring in a particular location in a block unit. Accordingly, bits constituting the data need to be dispersed through an interleaving process via the interleaver 520.

Data, which is dispersed via the interleaver 520 and consists of a bit string, is converted into a type suitable for transmission as a symbol unit. The symbol mapping unit 530 maps each data symbol with a carrier having a particular frequency, a particular phase and a particular amplitude. Various methods of making a mapped data symbol correspond to a physical subcarrier signal are utilized. As an example, a method of converting a mapped data symbol to a time domain signal using the IFFT module 540 may be utilized. When a time domain converted signal is transferred via a medium generating a channel delay, such as a multi-path fading environment, a CP needs to be added so as to prevent a symbol delay as described above. The CP adder 550 functions to add a CP.

Data which is processed into a type suitable for transmission is transmitted to a receiving end via various types of wired/wireless channels. In this instance, a signal passing through a channel may be distorted by noise and the like. Accordingly, in operation 561, a receiving end detects a boundary of a frame from a received signal in which the frame is a transmission unit of data. In operation 562, the received end estimates a subcarrier frequency offset with respect to each frame specified according to the detected frame boundary. Also, in operation 563, a cell containing the receiving end, for example, a portable device, is searched by using the estimated offset value. Namely, initial synchronization is performed. As another example of a frame boundary detecting apparatus according to the present invention, the frame boundary detecting apparatus may detect an approximate boundary index in operation 561, before a cell searching apparatus searches for a more precise frame boundary index in operation 563.

When the initial synchronization module 560 corrects a frequency offset of a channel, for example, establishes a connection with a transmitting end, an RAS corresponding to a corresponding cell on the basis of frame information identified according to the detected boundary, transmitted data may be detected through a process described below.

The receiving end removes the CP added to a time domain signal by using a CP remover 570. After this, the receiving end converts the time domain signal, from which the CP is removed, to a frequency domain signal via an FFT module 580. A demodulator 590 extracts symbol information from each frequency domain signal. Also, the demodulator 590 reconstructs an original transmission message by inputting the extracted symbol information into a de-interleaver 5100 and rearranging the dispersed bit string. Finally, a decoder 5110 functions to obtain source information which is encoded and compressed in the transmitting end.

As described above, a frame boundary detecting method and apparatus according to an embodiment of the present invention may be very important in completing an initial synchronization process. The initial synchronization process is performed to extract an original transmission message from a received signal in a receiving end of a digital communication system.

Also, the frame boundary detecting method according to an embodiment of the present invention is useful for estimating a frequency offset by a channel and searching for a cell containing a portable device. Further, for precise comparison with the conventional art, detailed description to the present invention will be limited to an OFDM/OFDMA based wireless communication system. However, the present invention is not limited thereto. Namely, when digital data is transmitted per a frame unit and the frame includes a particular type of an identifier, for example, a DL preamble, identifying a frame boundary, the present invention may be applicable to any frame boundary detecting method and apparatus using the identifier.

Figure 7:
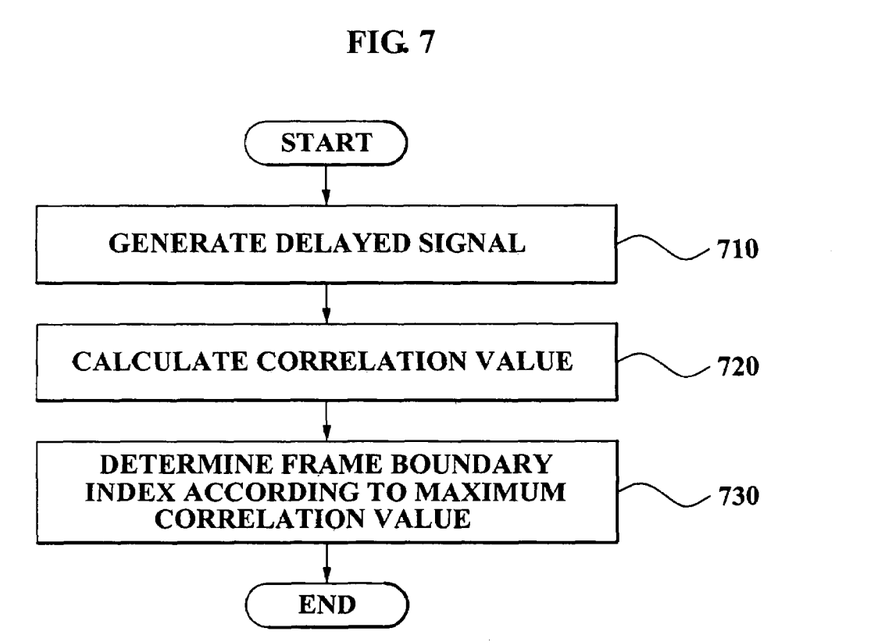
FIG. 7 is a flowchart illustrating a frame boundary detecting method according to an embodiment of the present invention.

FIG. 7 is a flowchart illustrating a method of detecting a frame boundary from a received signal according to an embodiment of the present invention. As illustrated in FIG. 7, in operation 710, a delayed signal is generated by delaying the received signal by a predetermined period. In operation 720, a correlation value between the received signal and the delayed signal is calculated. In operation 730, a timing index corresponding to a maximum value is determined as a frame boundary index, from a plurality of correlation values which are obtained by repeating the calculation.

A method of detecting a frame boundary by auto-correlating a received signal and a delayed signal, which is obtained by delaying the received signal by a predetermined period, according to an embodiment of the operations as illustrated in FIG. 7 is based on a periodical repetition property in a time domain of a preamble signal located in the frame boundary. A length of the repeated signal pattern is a repetition length. When a predetermined number of samples of a signal with respect to samples of a consecutively received signal and a delayed signal generated by delaying the signal by the repetition length are correlated, a correlation value becomes maximum at a starting location of a preamble, i.e., at a frame boundary. Namely, in operation 730, a maximum value is determined from correlation values calculated with respect to a consecutively received signal. The timing index is determined as a frame boundary index.

As described above, unlike the conventional method of determining a frame boundary by comparing a normalized correlation value and a predetermined threshold, the detection method according to an embodiment of the present invention calculates a maximum value from a plurality of correlation values. Accordingly, a frame boundary may be more precisely detected.

According to an embodiment of the present invention, a repetition length of the received signal may have a non-integer value on the basis of an FFT size and a number of segments selected from a transmission system. As an example, as described above, when the transmission system selects 1024 FFTs and 3 segments, the repetition length of the preamble signal is 341.33. In the case of a repetition length having a non-integer value as above, in the conventional art, oversampling is performed as many times as a number of segments. However, in the present invention, the repetition length having a non-integer value is approximated to an integer value by using any one of a ceiling operation, a rounding operation, and a floor operation. Namely, an increase in a hardware and software complexity may be prevented by approximating the repetition length and by not oversampling.

However, in the case of approximation of a repetition length, while an increase in a system complexity may be prevented, accuracy of frame boundary detection may be decreased. However, simulation results showed that the approximation of a repetition length had an insignificant effect on accuracy of frame boundary detection. Also, even in the case of interference by an error, the error may be compensated for by precise frame detection timing information obtained in the cell searching operation 563 of the initial synchronization module 560.

Figure 8:
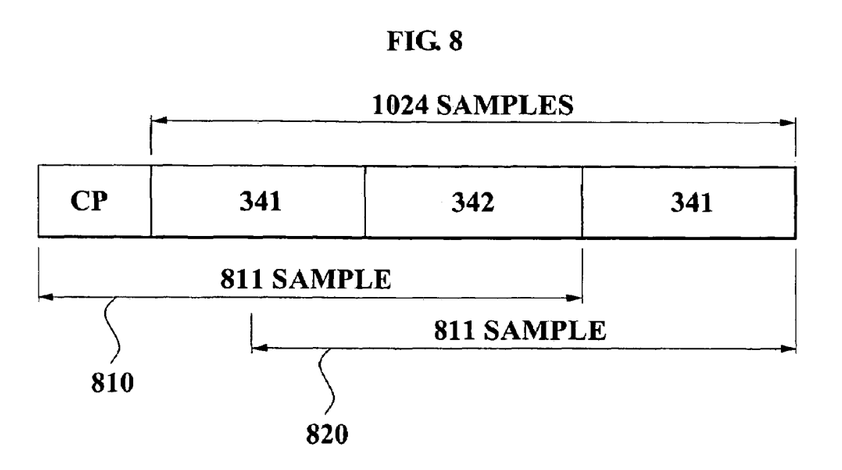
FIG. 8 is a diagram illustrating a configuration of a time domain preamble signal and a correlation length utilized in a frame boundary detecting method according to an embodiment of the present invention.

FIG. 8 is a diagram illustrating a configuration of a preamble signal and a correlation length, for example, a preamble signal, when an FFT size is 1024 and a number of segments 3. Referring to FIG. 8, a time domain preamble signal includes as many samples as a predetermined length of a CP and an FFT size. As illustrated in FIG. 8, a number of samples of the repetition length of the preamble signal is determined as 341 or 342 samples by using any one of a ceiling operation, a rounding operation, and a floor operation of a non-integer value. Namely, first and third repetition lengths consist of 341 samples by a rounding or floor operation of 341.33. Also, the second repetition length consists of 342 samples by a ceiling operation. This is to maintain a number of samples of the preamble signal to be 1024 samples which is identical to an FFT size, excluding a CP portion. Namely, the correlation length may include one cyclic prefix length and a number of repetition lengths one less than a total number of the repetition lengths in a frame.

According to an embodiment of the present invention, a preamble signal of a time domain includes a particular signal pattern taking a number of samples of a repetition length as its period. Accordingly, a delayed signal utilized in an auto-calculation for the pattern determination is a signal that is obtained by delaying a received signal by an integer multiple of a repetition period. Also, a longer correlation length improves accuracy of the calculation. Accordingly, the delayed signal may be delayed by the smallest value of integer multiples of the repetition period.

A preamble signal shown in FIG. 8 consists of 1152 samples which are obtained by adding 128 samples of a CP, and 1024 samples of an FFT size, according to an IEEE 802.16d/e standard. Accordingly, the correlation length is 811 samples in which 341 samples corresponding to the repetition length is subtracted from the total of 1152 samples.

Referring to FIG. 8, the correlation length consisting of 811 samples includes a CP. As described above, the CP is a length copying a part of a latter portion of a time domain signal corresponding to each transmitted symbol. Accordingly, in FIG. 8, a first length 810 and a second length 820 correspond to the same signal pattern. A maximum correlation value may be obtained by correlating the first length 810 and the second length 820. In this instance, the maximum correlation value is calculated as a maximum value of correlation values of which the number is the same as or smaller than a number of samples of a signal constituting a signal frame.

In addition to the received signal delaying operation 710, the correlation value calculating operation 720 and the frame boundary index determining operation 730, a frame boundary detecting method according to another embodiment of the present invention may further include repeating the operations 710, 720 and 730 with respect to a plurality of signals which are consecutively received over time, when the result of a frame boundary detection corresponds to a predetermined criterion. Namely, accuracy of frame boundary detection may be further improved by repeating the operations.

An example of the predetermined criterion may include when a maximum peak of the calculated correlation value is not large enough or when interval deviation of repeatedly calculated frame boundary indexes is large. However, those skilled in the related art may utilize at least one criterion for repeating operations constituting frame boundary detection, in addition to the above described criterion.

Also, a frame boundary detecting apparatus according to an embodiment of the present invention may include a correlation calculation unit calculating a correlation value by correlating a predetermined number of samples of a received signal and a delayed signal, which is obtained by delaying the received signal by a predetermined period, in a predetermined correlation length in a time domain, and a maximum value determination unit determining a maximum value from a plurality of correlation values obtained by repeating the calculation.

Figure 9:
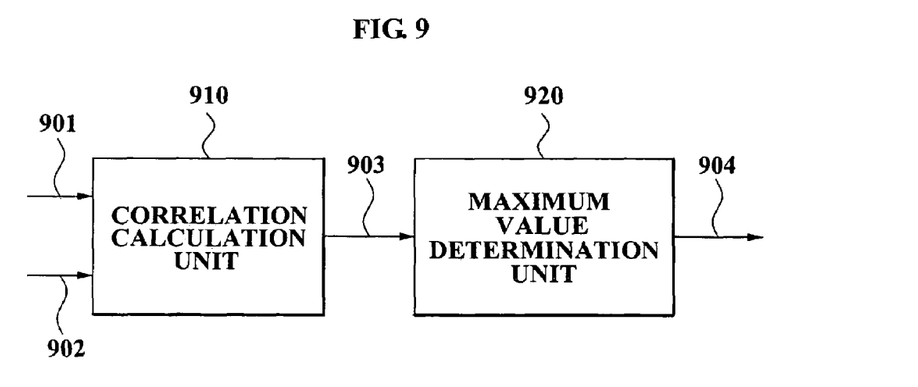
FIG. 9 is a block diagram illustrating an internal configuration of a frame boundary detecting apparatus according to an embodiment of the present invention.

FIG. 9 is a block diagram illustrating an internal configuration of the frame boundary detecting apparatus. Referring to FIG. 9, a correlation calculation unit 910 correlates a received signal 901 and a delayed signal 902, which is obtained by delaying the received signal 901 by a predetermined period. A maximum value determination unit 920 determines a maximum value from a plurality of correlation values 903 which are obtained by repeating the calculation with respect to the received signal, and extracts a timing index corresponding to the maximum value.

Figure 10:
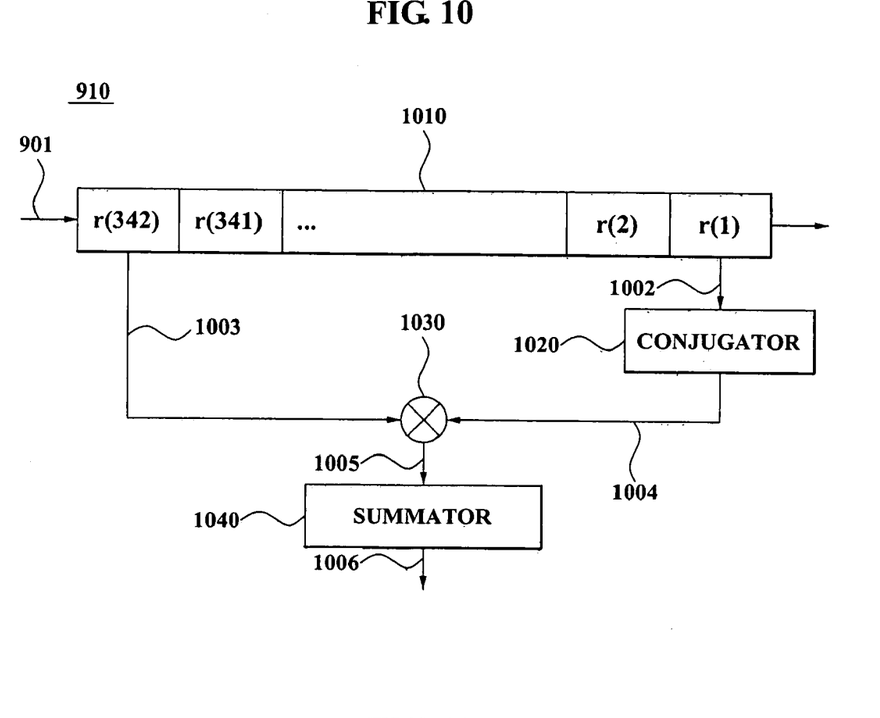
FIG. 10 is a diagram illustrating an example of an internal configuration of a correlation calculation unit which is an element of a frame boundary detecting apparatus according to an embodiment of the present invention.

FIG. 10 illustrates an example of an internal configuration of the correlation calculation unit 910. Referring to FIG. 10, the correlation calculation unit 910 may include a shift register 1010 of a predetermined length, a conjugator 1020, a multiplier 1030 and a summator 1040. In this instance, the shift register 1010 temporarily stores the received signal for the calculation of a correlation value. The conjugator 1020 calculates a complex conjugate 1004 of a first sample 1002 of the received signal 901 stored in the shift register 1010. The multiplier 1030 multiplies the complex conjugate 1004 calculated by the conjugator 1020 and a second sample 1003 of the received signal 901 stored in the shift register 1010. The summator 1040 sums a result of the multiplication 1005 calculated by the multiplier 1030 whenever an additional sample of the received signal 901 is stored in the shift register 1010.

$r(1)$, $r(2)$, . . . , $r(341)$ and $r(342)$ stored in the shift register 1010 of FIG. 10 indicate a first sample, a second sample, . . . , a $341^{st}$ sample and a $342^{nd}$ sample of the received signal 901, respectively. Namely, when a circuit generating a delayed signal is constructed by using a shift register, only a memory space for storing the size determined by the delayed length is needed, not a memory space for storing the entire received signal and the entire delayed signal. Accordingly, the apparatus may be more efficiently constructed.

Figure 11:
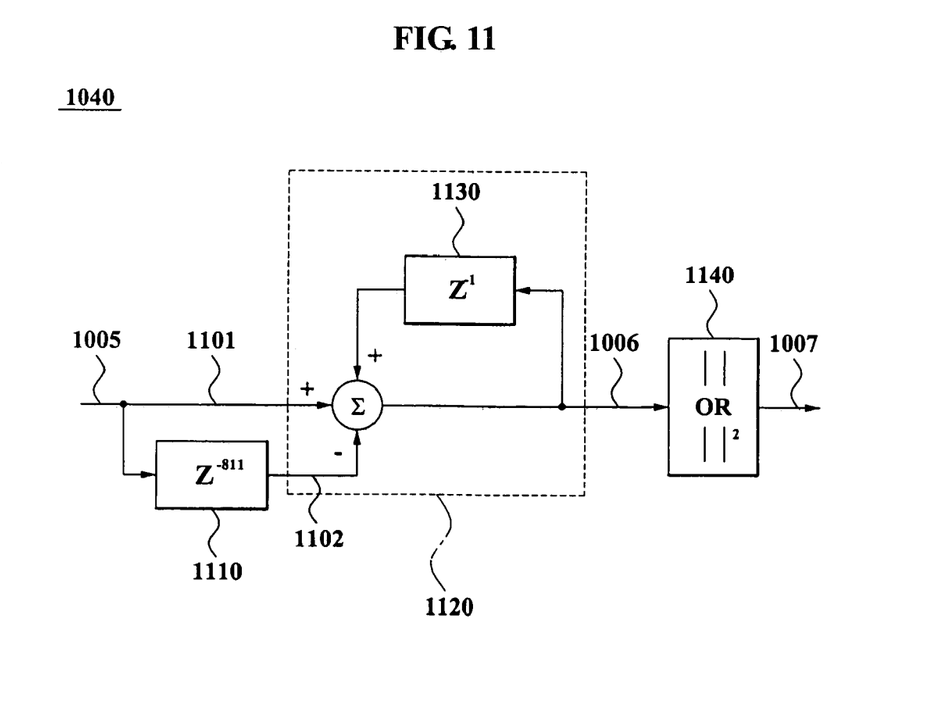
FIG. 11 is a diagram illustrating an example of an internal configuration of a summator which is an element of a correlation calculation unit of a frame boundary detecting apparatus according to an embodiment of the present invention.

Also, FIG. 11 illustrates an example of an internal configuration of the summator 1040. Referring to FIG. 11, the summator 1040 may include an adder/subtracter. In this instance, the adder/subtracter adds or subtracts a first delay result 1102 and a second delay result, and a result of the multiplication 1101, at every additional calculation of the multiplication 1005 result. In this instance, the first delay result 1102 and the second delay result are generated by delaying an additional result of the multiplication 1005 and the accumulated sum of the multiplication 1005 by a predetermined period respectively whenever the additional result of the multiplication 1005 is calculated with respect to the signal 901 consecutively received over time.

As illustrated in FIG. 11, a first delay result is generated by delaying a result of the multiplication by a sample period corresponding to a number of samples of a received signal, for example, 811 samples. In this instance, the first delay result is outputted by a first delay line 1110. Also, a second delay result is generated by delaying a result of the summation of the multiplication by one sample period. In this instance, the second delay result is outputted by a second delay line 1130.

The adder/subtracter 1120 includes an adder and a subtracter. The adder adds the second delay result and the result of the multiplication 1101 which is additionally calculated with respect to an additional sample. The subtracter subtracts the first delay result from the second delay result.

Specifically, the first delay line and the second delay line may be constructed as a shift register. In this case, the length of the shift register corresponding to the first delay line is 811 samples. This is determined on a basis of a size of a correlation length. Also, the length of the shift register corresponding to the second delay line is 1 sample. As described above, when the summator 1040 is constructed with a shift register, a memory space of the apparatus may be more efficient.

According to another embodiment of the present invention, the summator 1040 may further include an absolute value calculator or a squared absolute value calculator 1140 calculating an absolute value of the result of the multiplication 1006 summed by the adder/subtracter 1120, or a square of the absolute value thereof. Namely, as necessary, an output including an additional calculation may be outputted. In an ideal environment where a signal of each repetition length of a preamble signal is exactly matched and a boundary of the repetition length is accurately set, the result of the multiplication 1006 has a real value. However, in an actual preamble signal interfered with a sampling error and signal distortion caused by a channel variation, and an error caused by approximating a boundary of the repetition length, the result of the multiplication 1006, i.e., a correlation value, becomes a complex value. Accordingly, an absolute value or a squared absolute value is needed for comparing the size of a correlation value represented as the complex value.

Figure 12:
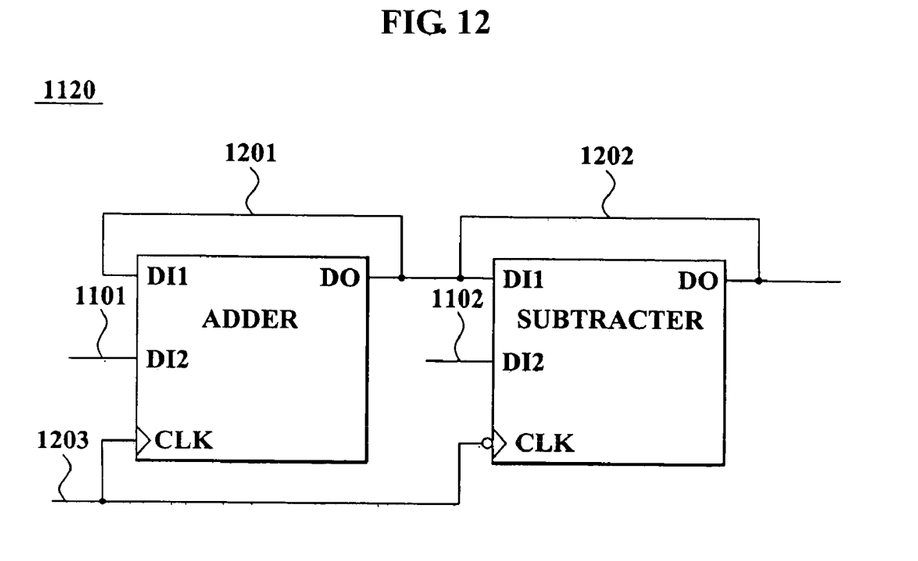
FIG. 12 is a diagram illustrating an example of an internal configuration of an adder/subtracter which is an element of a summator according to an embodiment of the present invention.

FIG. 12 illustrates an example of an explicit configuration of the adder/subtracter 1120 constituting the summator 1040. As described above, the adder/subtracter 1120 includes an adder and a subtracter which are activated by a predetermined clock signal 1203. The adder may add the additional result of the multiplication 1101 to an accumulated result of the addition 1201 at a rising edge of the clock signal 1203. In this stance, an output of the adder is connected to an input of the subtracter, which enables the subtracter to subtract the first delay result 1102 from a result of the subtraction 1202 in the case of a falling edge of the clock signal 1203. When a clock signal initially rising once and subsequently falling once is inputted, the output value 1006 of the adder/subtracter 1120 is outputted from an output terminal of the subtracter. Also, when a clock signal rises once after falling once, the adder/subtracter 1120 may have a configuration that an output of the subtracter may be connected to an input of the adder. Also, the adder/subtracter 1120 may have a configuration that the adder may be triggered in the case of a falling edge of the clock signal 1203 and the subtracter may be triggered in the case of a rising edge of the clock signal 1203. Namely, the internal configuration of the adder/subtracter 1120 constituting a frame boundary detecting apparatus according to an embodiment of the present invention is not limited to the example illustrated in FIG. 12.

Figure 13:
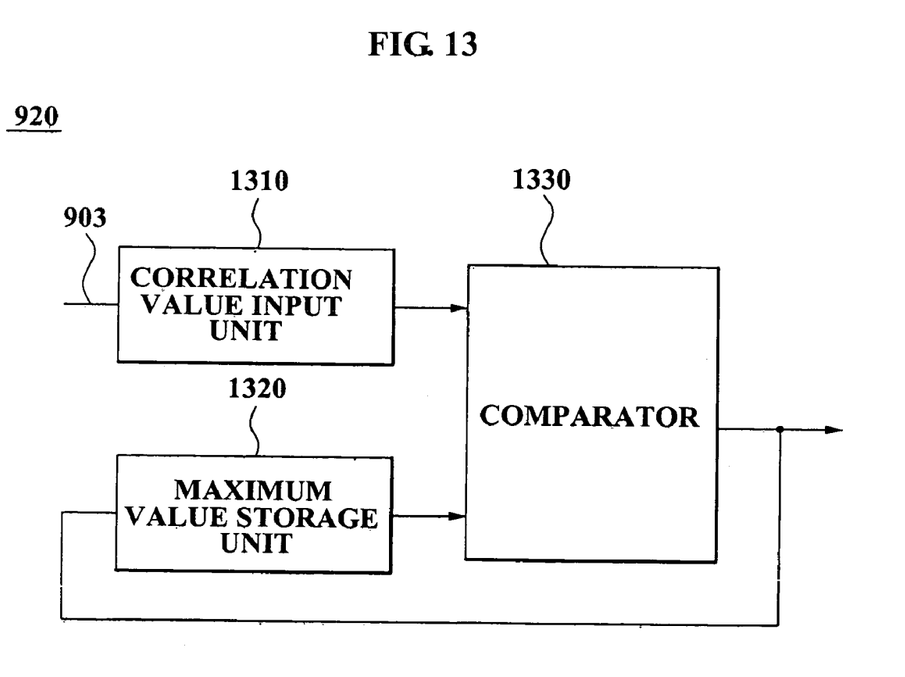
FIG. 13 is a block diagram illustrating an example of an internal configuration of a maximum value determination unit which is an element of a frame boundary detecting apparatus according to an embodiment of the present invention.

FIG. 13 is a block diagram illustrating an example of an internal configuration of the maximum value determination unit 920 shown in FIG. 9.

As illustrated in FIG. 13, the maximum value determination unit 920 may include a correlation value input unit 1310, a maximum value storage unit 1320 and a comparator 1330. The correlation value input unit 1310 receives the correlation value 903 calculated with respect to an additionally received signal over time. The maximum value storage unit 1320 stores an existing maximum value, which is compared with the additionally received correlation value 903, and index information corresponding thereto. The comparator 1330 outputs a larger value between the additionally received correlation value and the existing maximum value, as an updated maximum value. In this instance, an output of the comparator 1330, i.e., the updated maximum value, is stored in the maximum value storage unit 1320. According to the configuration as above, it is not necessary to store all calculated correlation values so as to obtain a maximum value. Namely, only a current maximum value and index information corresponding thereto are stored. Accordingly, a configuration of the apparatus may be simplified and a memory space may also be reduced.

A frame boundary detecting apparatus according to another embodiment of the present invention may include a portable device which receives a signal transmitted from an OFDM or OFDMA based wireless communication system.

A "portable device" as used in the present specification includes communication devices, such as a Personal Digital Cellular (PDC) phone, a personal communication service (PCS) phone, a personal handyphone system (PHS) phone, a Code Division Multiple Access (CDMA)-2000 (1X, 3X) phone, a Wideband CDMA phone, a dual band/dual mode phone, a Global Standard for Mobile Communications (GSM) phone, a mobile broadband system (MBS) phone, a Digital Multimedia Broadcasting (DMB) terminal, a smart phone, and an orthogonal frequency division multiplexing (OFDM) and OFDMA communication device; portable terminals such as a personal digital assistant (PDA), a hand-held PC, a notebook computer, a laptop computer, a WiBro terminal, an MP3 player, and an MD player; and all types of hand-held based wireless communication devices including an International Mobile Telecommunication (IMT)-2000 providing international roaming service and extended mobile communication service. Also, the "portable device" may include a predetermined communication module such as an OFDMA module, a CDMA module, a Bluetooth module, an Infrared Data Association (IrDA) module, a wired/wireless LAN card and a wireless communication device which is provided with a global positioning system (GPS) chip enabling tracking of a position via a GPS. Also, the "portable device" may include a microprocessor which can play multimedia and perform a certain calculation operation.

Also, a "digital communication system" as used in the present specification may be a wireless communication system based on any one of an IEEE 802.16d/e standard, WiBro, and WiMAX.

Figure 14:
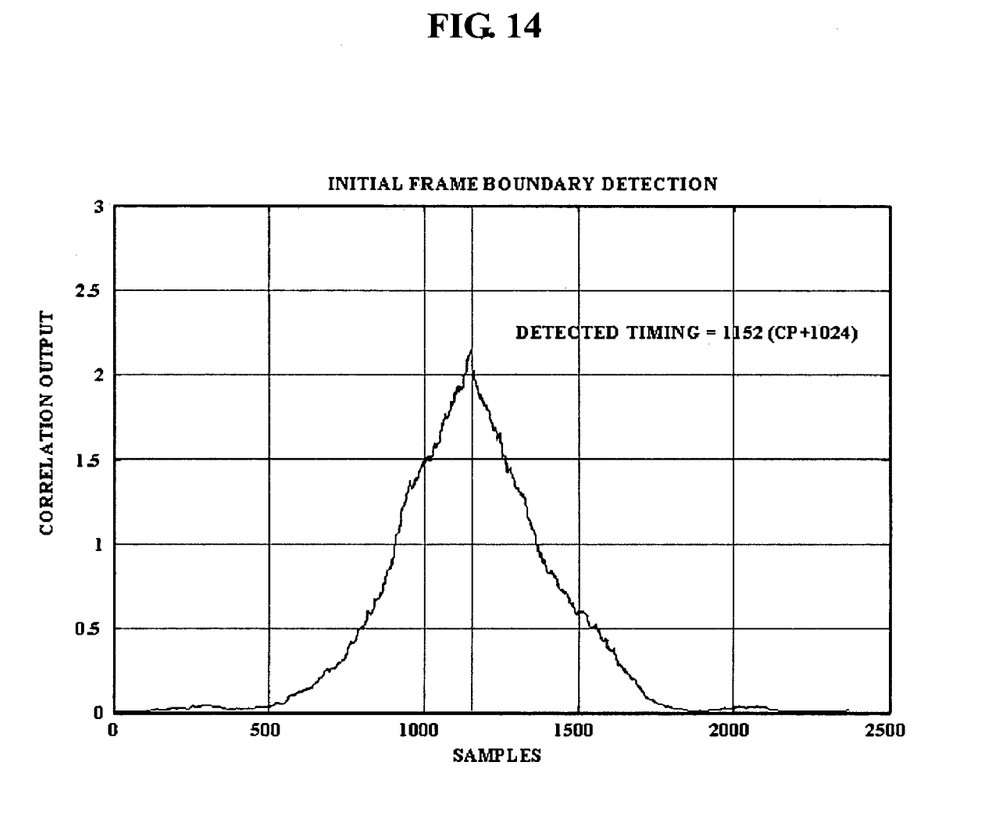
FIG. 14 is a graph illustrating simulation results of a frame boundary detecting method and apparatus according to an embodiment of the present invention.

FIG. 14 is a graph illustrating simulation results of a frame boundary detecting method and apparatus according to an embodiment of the present invention.

Referring to FIG. 14, simulation results by adopting a method of detecting a frame boundary of a received signal according to an embodiment of the present invention are illustrated. When applying the frame boundary detecting method according to an embodiment of the present invention, a detected timing having a maximum correlation value output is a $1152^{nd}$ symbol. Accordingly, the $1152^{nd}$ symbol may be determined as a frame boundary. It can be seen that the determined frame boundary has no error with a result obtained by adding CP and a total number of FFTs in a frame.

As described above, the present invention may be applied to general digital communication systems. However, in the case of a portable device in an OFDM/OFDMA based digital communication system, a frame boundary of a transmitted signal needs to be detected quickly and accurately so as to establish a connection with an RAS corresponding to a cell containing the portable device and to stably communicate data with the RAS.

Namely, on the basis of a frame boundary detected by the frame boundary detecting method and apparatus according to an embodiment of the present invention, a frequency offset of a corresponding frame is estimated. A cell containing the portable device may be searched through a preamble signal located in the frame boundary. An embodiment of the present invention relates to a method and apparatus for quickly and accurately detecting frame boundary information which is necessary for establishing a connection with an RAS and stably communicate data with the RAS. Accordingly, the present invention is applied to a frame boundary detecting apparatus installed in a portable device, particularly, in an OFDM/OFDMA based digital communication system.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

A frame boundary detecting method and apparatus according to an embodiment of the present invention may improve accuracy of frame boundary detection by determining a maximum value from a plurality of correlation values obtained through repeating a calculation and calculating a timing index at the maximum correlation value as a frame boundary index.

Also, a frame boundary detecting method and apparatus according to an embodiment of the present invention may utilize a non-oversampled signal in a correlation signal by approximating a repetition length of a preamble signal to an integer value [this is a little awkward, how about something like "approximate a repetition length of a preamble signal to an integer without oversampling a received signal in calculating correlation values. Accordingly, a number of samples of a signal utilized for a correlation calculation, that is, a correlation length, may be shortened and complexity of the frame boundary detection method and apparatus may be reduced.

Also, a frame boundary detecting method according to an embodiment of the present invention auto-calculates a received signal in a time domain and a delayed signal, obtained by delaying the received signal by a predetermined period, by utilizing a Fourier transformed time domain signal including a repetition length and also utilizing a periodical repetition property of a preamble signal in a time domain. In this case, the received signal does not need to be converted to a frequency domain to detect a frame boundary each time. Accordingly, a frame boundary detecting speed may be increased. Also, an apparatus adopting the frame boundary detection method may be constructed by using only a small amount of resources.

Also, a frame boundary detecting method and apparatus according to an embodiment of the present invention determines a correlation length to include one cyclic prefix length and a number of repetition lengths to be one less than a total number of the repetition lengths in a frame. Accordingly, a correlation calculation may be performed in a maximum correlation length in which accuracy of the correlation calculation may be improved and a calculation burden may be reduced. Through this, a frame boundary may be quickly and accurately detected.

Also, a frame boundary detecting method and apparatus according to an embodiment of the present invention may quickly and accurately detect a frame boundary of a transmitted signal in an OFDM/OFDMA based wireless communication system. Accordingly, a portable device adopting or including the method and/or apparatus may be more efficiently constructed.

Also, a frame boundary detecting method and apparatus according to an embodiment of the present invention determines a repetition length as any one of 341 and 342 samples, a length of the CP as 128 samples, a correlation length as 811 samples, and a delayed period as 341 samples. Accordingly, a frame boundary may be detected by a suitable method in an OFDM/OFDMA based wireless communication system according to an IEEE 802.16d/e standard where an FFT size is 1024 samples and a number of segments is 3.

Also, a frame boundary detecting method according to an embodiment of the present invention may improve accuracy of frame boundary detection by repeatedly generating a delayed signal by delaying the received signal by a predetermined period, calculating a correlation value by correlating the received signal and the delayed signal in a predetermined correlation length in a time domain, and determining a timing index corresponding to a maximum value, as a frame boundary index, from a plurality of correlation values.

Also, a frame boundary detecting apparatus according to an embodiment of the present invention includes a correlation calculation unit calculating a correlation value by correlating a predetermined number of samples of a received signal and a delayed signal which is obtained by delaying the received signal by a predetermined period, in a predetermined correlation length in a time domain, and a maximum value determination unit determining a maximum value from a plurality of correlation values obtained by repeating the calculation. Namely, a configuration of the apparatus is simplified. Accordingly, an operating speed of the apparatus may be improved, and a power consumption and a manufacturing cost may be reduced.

Also, a correlation calculation unit of a frame boundary detecting apparatus according to an embodiment of the present invention includes a shift register, a conjugator, a multiplier and a summator. Accordingly, memory resources used for a correlation calculation may be reduced and an operation performance of the apparatus may be improved.

Also, the summator constituting the correlation calculation unit may include a first delay line, a second delay line and an adder/subtracter. Accordingly, memory resources used for summing the result of the multiplication may be reduced.

Also, the summator may include an absolute value calculator or a squared absolute value calculator. Accordingly, effects caused by an error may be appropriately compensated for by approximating a signal distortion caused by a channel, a sampling error, and an error caused by approximating a repetition length to an integer value. Accordingly, a comparable real correlation value may be calculated.

Also, a maximum value determination unit of the frame boundary detecting apparatus according to an embodiment of the present invention may include a maximum storage unit, a correlation value input unit, and a comparator. Accordingly, memory resources of the apparatus may be efficiently utilized by storing only a current correlation value and index information corresponding thereto, that is, by not storing all correlation values obtained by repeating the correlation.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for detecting a frame boundary of a received signal in a digital communication system, the method comprising:
   (a) a receiver of the digital communication system, generating a delayed signal by delaying the received signal by a predetermined period, the received signal including two or more segments of samples repeated in a time domain, each segment having a repetition length corresponding to a non-integer number of samples;
   (b) the receiver of the digital communication system, calculating a plurality of correlation values by correlating first sequences of samples in the received signal with second sequences of samples in the delayed signal across a predetermined correlation length in the time domain, wherein the predetermined correlation length is determined at least by performing one of a ceiling operation, a rounding operation or a floor operation on the repetition length; and
   (c) the receiver of the digital communication system, determining a frame boundary of the received signal based on a timing index corresponding to a largest correlation value of the plurality of correlation values.

2. The method of claim 1, wherein the digital communication system is an Orthogonal Frequency Division Multiplexing (OFDM) or Orthogonal Frequency Division Multiple Access (OFDMA) based wireless communication system.

3. The method of claim 1, further comprising:
   repeating (a) to (c), with respect to a plurality of signals consecutively received over time responsive to frame boundary detection satisfying a predetermined criterion.

4. A computer readable storage medium storing instructions when executed by a processor causing the processor to implement the method of claim 1.

5. A method for detecting a frame boundary of a received signal in a digital communication system, the method comprising:
   generating a delayed signal by delaying the received signal by a predetermined period, the received signal including two or more segments of samples repeated in a time domain, each segment having a repetition length;
   calculating a plurality of correlation values by correlating the first sequences of samples in the received signal with second sequences of samples in the delayed signal across a predetermined correlation length in the time domain, wherein the correlation length corresponds to a sum of a cyclic prefix length and a total length of segments in the received signal minus one segment; and
   determining a frame boundary of the received signal based on a timing index corresponding to a largest correlation value of the plurality of correlation values.

6. The method of claim 5, wherein:
   the repetition length corresponds to any one of 341 and 342 samples,
   the cyclic prefix length corresponds to 128 samples,
   the correlation length corresponds to 811 samples, and
   the predetermined period corresponds to 341 samples.

7. An apparatus for detecting a frame boundary of a received signal in a digital communication system, the apparatus comprising:
   a correlation calculation unit calculating a correlation value by correlating first sequences of samples in the received signal with second sequences of samples in a delayed signal across a predetermined correlation lengths in a time domain, the delayed signal obtained by delaying the received signal by a predetermined period, each segment having a repetition length corresponding to a non-integer number of samples, wherein the predetermined correlation length is determined at least by performing one of a ceiling operation, a rounding operation or a floor operation on the repetition length; and a maximum value determination unit determining a frame boundary of the received signal based on a timing index corresponding to a largest correlation value of the plurality of correlation values.

8. The apparatus of claim 7, wherein the apparatus is included in a portable device receiving a signal transmitted from a wireless communication system based on at least one of OFDM and OFDMA.

9. The apparatus of claim 7, wherein the correlation calculation unit comprises:
- a shift register temporarily storing the received signal for the calculation of a correlation value;
- a conjugator calculating a complex conjugate of a first sample of the received signal stored in the shift register;
- a multiplier multiplying the complex conjugate calculated by the conjugator and a second sample of the received signal stored in the shift register; and
- a summator summing a result of the multiplication calculated by the multiplier whenever an additional sample of the received signal is stored in the shift register.

10. The apparatus of claim 9, wherein the summator comprises:
- a first delay line generating a first delay result by delaying the result of the multiplication by sample periods corresponding to the number of samples of the received signal;
- a second delay line generating a second delay result by delaying the result of the summation of the multiplication by one sample period; and
- an adder/subtracter adding the result of the multiplication to the second delay result and subtracting the first delay result from the second delay result.

11. The apparatus of claim 10, wherein the summator further comprises an absolute value calculator or a squared absolute value calculator calculating an absolute value of the result of the summation obtained by the adder and the subtracter, or a square of the absolute value thereof.

12. The apparatus of claim 9, wherein the length of the shift register corresponds to 342 samples, and the received signal includes 811 samples.

13. The apparatus of claim 7, wherein the maximum value determination unit comprises:
- a maximum value storage unit storing a larger value from a plurality of correlation values with respect to the plurality of signals which are consecutively received in time;
- a correlation value input unit receiving a correlation value calculated with respect to a signal additionally received over time; and
- a comparator comparing the maximum value stored in the maximum value storage unit and the calculated correlation value of the additionally received signal received by the correlation value input unit.

\* \* \* \* \*